United States Patent
Theobald et al.

(10) Patent No.: US 8,045,725 B2
(45) Date of Patent: Oct. 25, 2011

(54) VEHICLE INTERIOR ACTIVE NOISE CANCELLATION

(75) Inventors: Mark A. Theobald, Bloomfield Hills, MI (US); David M. Hammelef, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 414 days.

(21) Appl. No.: 12/424,622

(22) Filed: Apr. 16, 2009

(65) Prior Publication Data

US 2010/0266135 A1 Oct. 21, 2010

(51) Int. Cl.
G10K 11/16 (2006.01)

(52) U.S. Cl. ...................................................... 381/71.4

(58) Field of Classification Search ................... 381/71.4
See application file for complete search history.

(56) References Cited

U.S. PATENT DOCUMENTS

| | | | | |
|---|---|---|---|---|
| 3,158,835 A * | 11/1964 | Hipkins | ........................ | 340/902 |
| 5,204,971 A * | 4/1993 | Takahashi et al. | ......... | 455/185.1 |
| 5,371,802 A * | 12/1994 | McDonald et al. | .......... | 381/71.4 |
| 5,635,903 A * | 6/1997 | Koike et al. | .................. | 340/441 |
| 5,734,726 A * | 3/1998 | Truchsess | ....................... | 381/61 |
| 6,275,590 B1 * | 8/2001 | Prus | ................. | 381/61 |
| 6,356,185 B1 * | 3/2002 | Plugge et al. | .............. | 340/384.3 |
| 6,529,605 B1 * | 3/2003 | Christoph | ....................... | 381/56 |
| 6,859,539 B1 * | 2/2005 | Maeda | ............................. | 381/86 |
| 6,912,286 B1 * | 6/2005 | Daly | ............................. | 381/71.1 |
| 6,959,094 B1 * | 10/2005 | Cascone et al. | ................. | 381/86 |
| 7,088,829 B1 * | 8/2006 | Schick et al. | ................ | 381/71.4 |
| 7,203,321 B1 * | 4/2007 | Freymann et al. | .............. | 381/61 |
| 7,501,934 B2 * | 3/2009 | Tischer | ...................... | 340/384.3 |
| 7,764,800 B2 * | 7/2010 | Maeda | ............................. | 381/86 |
| 7,808,370 B2 * | 10/2010 | Tischer | ...................... | 340/384.1 |
| 7,961,894 B2 * | 6/2011 | Honji | ............................. | 381/61 |
| 2005/0113168 A1 * | 5/2005 | Maeda | ............................. | 463/35 |
| 2008/0240456 A1 * | 10/2008 | Sakamoto et al. | ........... | 381/71.4 |
| 2009/0080672 A1 * | 3/2009 | Smith | ............................. | 381/86 |
| 2010/0266135 A1 * | 10/2010 | Theobald et al. | ............. | 381/71.4 |
| 2011/0142248 A1 * | 6/2011 | Sakamoto et al. | ........... | 381/71.4 |
| 2011/0175718 A1 * | 7/2011 | Inoue | ............................. | 340/463 |
| 2011/0181442 A1 * | 7/2011 | Nakayama | ..................... | 340/933 |

OTHER PUBLICATIONS

Laura R. Ray et al; Hybrid feedforward-feedback active noise reduction for hearing protection and communication; Journal of Acoustical Society of America, vol. 120, No. 4, Oct. 2006.
ProActive, The Official Industry Newsletter of Lotus Engineering, Issue 24, Jan./Feb. 2008, pp. 15-17.

* cited by examiner

*Primary Examiner* — Elvin G Enad
*Assistant Examiner* — Robert W Horn
(74) *Attorney, Agent, or Firm* — Quinn Law Group, PLLC

(57) ABSTRACT

A vehicle has an electric drive mode, a body defining a vehicle interior, a first and second set of audio speakers positioned outside and inside of the interior, respectively, and a controller. The controller generates an acoustic signal, broadcasts the acoustic signal via the first set of speakers during an electric drive mode, and generates and broadcasts a cancelling signal via the second set of speakers. The broadcasts are coordinated to substantially cancel an attenuated portion of the acoustic signal resulting from propagation of the acoustic signal into the interior. A method cancels a synthesized sound within a vehicle interior by collecting vehicle operating values, generating an acoustic signal as the synthesized sound during an electric drive mode, and processing the acoustic signal to generate a modified acoustic signal approximating an attenuated portion of the acoustic signal propagating into the vehicle interior.

15 Claims, 2 Drawing Sheets

VEHICLE INTERIOR ACTIVE NOISE CANCELLATION

TECHNICAL FIELD

The present invention relates generally to the control of noise or sound within a vehicle, and in particular to the active cancellation of a synthesized noise or sound within a vehicle interior during a predetermined synthesized sound event.

BACKGROUND OF THE INVENTION

Electric vehicles (EV) and hybrid electric vehicles (HEV) obtain optimal fuel economy largely by means of electric propulsion, wherein a high-voltage battery, working in conjunction with one or more onboard electric motor/generators and/or an offboard electrical power supply, provides the required propulsive energy. For example, a typical full HEV can selectively utilize a high-voltage battery module or energy storage system (ESS) as a propulsive energy source during conditions under which an electric motor is relatively efficient, automatically transitioning to propulsion via an internal combustion engine at higher speeds. Likewise, an extended-range EV equipped with a suitable high-voltage ESS can operate exclusively using electric power.

In addition to the distinct performance advantages of using an electric motor as a vehicular propulsion device, an electric motor can operate almost noiselessly, i.e., without the familiar combustion and fan sounds generated by a conventional gasoline-powered internal combustion engine. As a result, the relatively tranquil environment in an EV or HEV interior can be another desirable feature of such vehicle designs. However, for other drivers the familiar engine sounds can be desirable during all operating modes. Therefore, in order to optimize the driving experience some modern vehicles are adapted to synthesize or broadcast engine sounds in response to throttle and/or speed signals, such as by generating the sound of a sporty or high-performance engine during an electric drive mode.

Additionally, certain vehicles are configured to transmit or broadcast synthesized engine noises or other warning sounds outside of the vehicle when propelled via electric power in order to alert pedestrians, cyclists, and other persons or animals in the path of or in close proximity to the otherwise nearly silent vehicle. While such synthesized sounds have notable advantages, the perception of synthesized sounds within the vehicle interior may be undesirable to some drivers and passengers, particularly those who highly value the relative tranquility of electric propulsion.

SUMMARY OF THE INVENTION

Accordingly, a vehicle is provided having an active noise cancellation (ANC) system that reduces a passenger-perceptible level of an acoustic signal generated or synthesized aboard the vehicle, and broadcast outside of the vehicle, e.g., for signaling or alerting pedestrians to the approach of the vehicle. The ANC system includes an electronic control unit or controller that is provided or pre-armed with the characteristics of the particular waveform describing the acoustic signal prior to its transmission or broadcast outside of the vehicle interior. The controller is also provided with a model of or means of determining the unique acoustic characteristics of the vehicle body so as to estimate or determine the attenuating and/or damping effects of the vehicle body on the acoustic signal as it propagates into the vehicle interior, as well as accounting for the time required for such a propagation. Any desirable sounds, such as those emitted by an on-board entertainment system, are allowed to be broadcast within the vehicle interior with minimal interference, while the synthesized noises or sounds as well as actual powertrain noises from the engine or electric motor are selectively cancelled within the vehicle interior, thereby optimizing the user-perceived acoustics.

The vehicle selects, synthesizes, or otherwise generates the acoustic signal during a predetermined vehicle operating state, such as when the vehicle is operating exclusively under electric power in a reverse or a relatively low forward rate of speed. Prior to broadcast of the acoustic signal, the waveform characteristics of the acoustic signal are processed to determine an appropriate cancelling signal, rather than relying on the sensing or detecting of the acoustic signal after its broadcast using a microphone or other detection means in the manner of conventional noise cancellation systems. The broadcast of the cancelling signal is then coordinated with that of the acoustic signal for optimal waveform interference and cancelling effect.

In particular, a vehicle having an electric drive mode, such as reverse and/or a threshold forward speed mode as noted above, includes a vehicle body defining a vehicle interior, a first set of audio speakers positioned outside of the vehicle interior, and a second set of audio speakers positioned within the vehicle interior. An electronic control unit or controller is also included. During the electric drive mode or modes, the controller automatically generates or synthesizes an acoustic signal that is suitable for warning a pedestrian or other being as to the approach of the vehicle, with the acoustic signal being determined by a plurality of vehicle operating values, e.g., vehicle speed, throttle level, transmission state or mode, etc. A cancelling signal is generated or synthesized by the controller for broadcast within the vehicle interior.

In determining the appropriate cancelling signal, the controller can consider, for example, the rate of propagation of the acoustic signal from the first set of speakers at the front and/or rear of the vehicle as the waveform travels through the vehicle body and into the vehicle interior, as well as the unique acoustic characteristics of the vehicle body itself. That is, the controller processes or filters the acoustic signal to produce a modified acoustic signal, i.e., a signal representing the attenuated portion of the acoustic signal as it is perceived within the vehicle interior. The cancelling signal is then broadcast into the vehicle interior via the second set of audio speakers in a coordinated manner with the broadcast of the acoustic signal via the first set of audio speakers. In this manner, the acoustic signal is rendered substantially inaudible to any passengers traveling within the vehicle interior.

A method is also provided for actively cancelling a synthesized sound within the vehicle interior described above. The method includes collecting a set of vehicle operating values, including detecting an electric drive mode, and generating an acoustic signal as the synthesized sound during the electric drive mode. The acoustic signal has a characteristic that is determined at least in part by the set of vehicle operating values. The method also includes processing the acoustic signal to generate a modified acoustic signal, which as noted above approximates the attenuated portion of the acoustic signal ultimately reaching the vehicle interior after propagating from the first set of speakers positioned outside of the vehicle interior, through the vehicle body, and into the vehicle interior. A cancelling signal is automatically generated that is adapted to substantially cancel the modified acoustic signal within the vehicle interior, and the acoustic signal is broadcast via the first set of audio speakers while the cancelling signal is broadcast via the second set of audio speakers.

DESCRIPTION OF THE PREFERRED EMBODIMENTS

Figure 1:
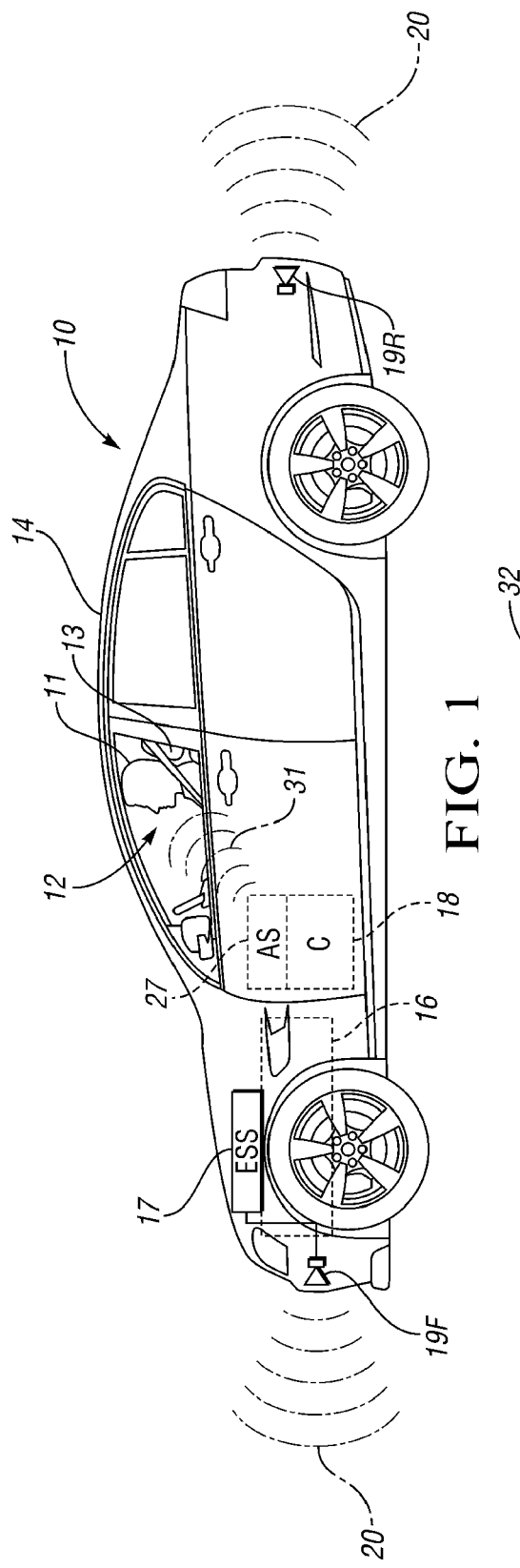
FIG. 1 is a schematic illustration of a vehicle having an active noise cancellation (ANC) system in accordance with the invention.

Referring to the drawings, wherein like reference numbers correspond to like or similar components throughout the several figures, and beginning with FIG. 1, a vehicle 10 includes a passenger compartment or interior 12 having one or more seats 13 each being suitable for transporting a passenger 11, with the interior 12 defined by a vehicle body 14. Within the scope of the invention, the vehicle 10 can be configured as an extended-range electric vehicle (EV), a two-mode or plug-in style hybrid electric vehicle (HEV), a fuel-cell powered vehicle, or any other vehicle design or configuration having at least one electric-only operating state or electric propulsion mode, hereinafter referred to as "electric drive".

The vehicle 10 includes a powertrain 16. As noted above, the powertrain 16 can be of either a hybrid-electric or a purely electric design. Regardless of the particular configuration of the powertrain 16, the powertrain 16 includes a high-voltage battery or electric storage system (ESS) 17 suitable for storing and supplying electrical energy necessary for propelling the vehicle 10 during the electric drive mode or modes. As will be understood by those of ordinary skill in the art, the ESS 17 can be selectively recharged via one or more onboard motor/generators (not shown), for example during a regenerative braking event or whenever such motor/generators are operating as a generator.

The vehicle 10 is equipped with an audio and/or entertainment system (AS) 27, e.g., a radio, a compact disc player, an MP3 player, etc., suitable for providing a sound signal 31, and an active noise cancellation (ANC) system 32 (see FIG. 2) having an electronic control unit or controller (C) 18. The controller 18 is specially adapted for selecting, synthesizing, or otherwise generating an acoustic signal 20, as well as for transmitting, emitting, or otherwise broadcasting the acoustic signal 20 outside of the vehicle 10, i.e., in a direction away from the interior 12. Within the scope of the invention, the acoustic signal 20 can be a simulated engine, fan, and/or other desired vehicle noise, a steady or intermittent warning tone or signal, and/or any other tone or signal suitable for alerting a pedestrian, cyclist, animal, etc., positioned in the path of the vehicle 10.

As noted above, in an electric drive mode the vehicle 10 can operate very quietly, particularly when traveling at a low rate of speed, and therefore the approach of the vehicle 10 can be relatively difficult to perceive, particularly for a person having obstructed or impaired vision. Because electric drive can be used for both forward and reverse directions of travel, the vehicle 10 can be equipped with a weatherproof front set of audio speakers 19F and a weatherproof rear set of audio speakers 19R, with the particular set of speakers 19F, 19R being automatically selectable by the controller 18 based on the direction of travel in an exemplary embodiment.

Figure 2:
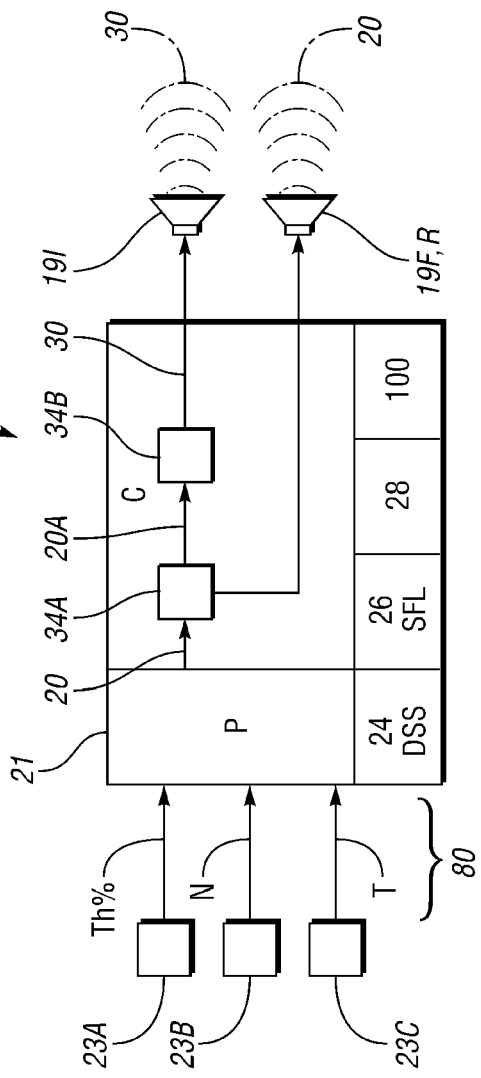
FIG. 2 is a schematic illustration of an ANC system that can be used with the vehicle of FIG. 1.

Referring to FIG. 2, the ANC system 32 includes the controller 18, a set of sensors 23A, 23B, and 23C, and the sets of audio speakers 19I, 19F, and 19R. The controller 18 includes a microprocessor unit or processor (P) 21 adapted to receive and process a set of vehicle operating values 80. The vehicle operating values 80 can include, without necessarily being limited to, a throttle level (Th %), a vehicle speed (N), a transmission mode or state (T), window, sunroof, or convertible top open or close state, and/or any other vehicle operating values suitable for determining when to generate the acoustic signal 20, and the particular characteristics such a waveform should take. The controller 18 can be configured as a self-contained system or device, or can be included as an integral part of a distributed or a central control module for the vehicle 10, thus having additional control modules and capabilities as might be necessary to execute all required system control functionality aboard the vehicle 10 in the desired manner.

Additionally, the controller 18 can be configured as a general purpose digital computer generally comprising a microprocessor or central processing unit, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Any algorithms resident in the controller 18 or accessible thereby, including an algorithm 100 described below with reference to FIG. 3, can be stored in ROM and automatically executed to provide the respective functionality.

The controller 18 is in electrical communication with the sensors 23A, 23B, and 23C, each of which is specially adapted for measuring, detecting, calculating, or otherwise collecting an associated one of the vehicle operating values 80 shown in FIG. 2, and for relaying or transmitting the associated information to the controller 18. In response to the vehicle operating values 80, the controller 18 generates the acoustic signal 20 for later broadcast via some or all of the audio speakers 19F, 19R, e.g., when the vehicle 10 of FIG. 1 is operating in electric drive mode. However, the scope of the invention is not intended to be limited to sound generation solely during an electric drive mode. For example, if the vehicle 10 is equipped with a modern internal combustion engine that operates quietly at low rates of travel, it may be desirable to generate the acoustic signal 20 while the engine is running.

Still referring to FIG. 2, in order to facilitate generation of the acoustic signal 20, the controller 18 can include or can have access to a digital sound synthesizer module or DSS 24 and/or a sound file library (SFL) 26 of pre-generated or pre-recorded sound files having a suitable digital or analog format. In particular, the DSS 24 is configured to generate the acoustic signal 20 having an appropriate or suitable amplitude and waveform for the given set of vehicle operating values 80. For example, at very low rates of travel of the vehicle 10 of FIG. 1, the acoustic signal 20 could simulate engine or fan noise with a relatively low amplitude, with the amplitude and/or frequency increasing in conjunction with the throttle level (Th %) and/or vehicle speed (N).

Likewise, a particular pre-generated or pre-recorded sound file could be extracted or selected from the SFL 26, with the characteristics of the selected sound file to be broadcast via the audio speakers 19F and/or 19R being dependent to some extent on the vehicle operating values 80. For example, an optional lookup table 28 or other suitable reference file could be provided, e.g., a lookup table that is indexed by each of the throttle level (Th %) and the vehicle speed (N), with the particular sound file extracted from the SFL 26 being determined by the corresponding entry in the lookup table 28. Such an SFL 26 could include analog waveforms in addition to or instead of digital waveforms without departing from the intended scope of the invention.

Still referring to FIG. 2, the controller 18 can be adapted to include a processing module 34A suitable for processing, filtering, and/or delaying the broadcast of the acoustic signal 20 via the speaker or speakers 19F, 19R in order to a provide sufficient time lag for generating a cancelling signal 30, described below, which is then later broadcast within the vehicle interior 12 via the set of interior audio speakers 19I in a coordinated manner with the broadcast of the acoustic signal 20. That is, the controller 18 can first route the generated or extracted acoustic signal 20 through the processing module 34A, wherein the acoustic signal 20 is sufficiently processed, filtered, and/or delayed for a calibrated duration before being broadcast via the audio speakers 19F and/or 19R.

Within the first processing module 34A, the acoustic signal 20 can also be processed using a calibrated attenuation model of the vehicle body or other suitable processing means in order to determine a modified acoustic signal 20A. The modified acoustic signal 20A thus approximates the characteristics of the acoustic signal 20 as it would be perceived by a passenger 11 seated within the vehicle interior 12 after broadcast via the audio speakers 19F and/or 19R.

The modified acoustic signal is then transmitted or relayed to a second processing module 34B, wherein a cancelling signal 30 is generated as a function of the modified acoustic signal 20A. As will be understood by those of ordinary skill in the art, for proper interference the cancelling signal 30 should have an amplitude that is substantially equal to or directionally proportional to that of the acoustic signal 20, and a phase that is opposite that of the modified acoustic signal 20. The cancelling signal 30 is designed to substantially minimize perception by the passenger 11 of the acoustic signal 20 within the vehicle interior 12, without otherwise interfering with any desirable sounds therein, such as the sound signal 31 shown in FIG. 1.

In order to prevent alternating zones of constructive and destructive interference within the vehicle interior 12, the number and position of interior audio speakers 19I can be varied as needed depending on the particular design and/or the particular modal response or sound damping characteristics of the vehicle 10, with one or more audio speakers 19I being positioned on a portion of the seat 13 shown in FIG. 1 in an exemplary embodiment so as to be in close proximity to the passenger 11.

Unlike conventional active noise cancellation methods that only sense or detect an incoming audio signal using a microphone or other means after the signal has been produced, the controller 18 is effectively pre-armed with foreknowledge of the incoming dynamic acoustic signal, i.e., the acoustic signal 20, prior to its broadcast. By accounting for the unique effect of the vehicle 10 on the acoustic signal 20 as it propagates to the interior 12, such as by providing the processing module 34A with a pre-calibrated filter or attenuation model, the controller 18 can be pre-tuned and adapted for optimal performance. The broadcast of the acoustic signal 20 outside of the vehicle 10 of FIG. 1 via the audio speakers 19F, 19R and the broadcast of the cancelling signal 30 within the interior 12 via the audio speakers 19I are closely coordinated or synchronized for optimal interference and resultant cancelling effect.

Figure 3:
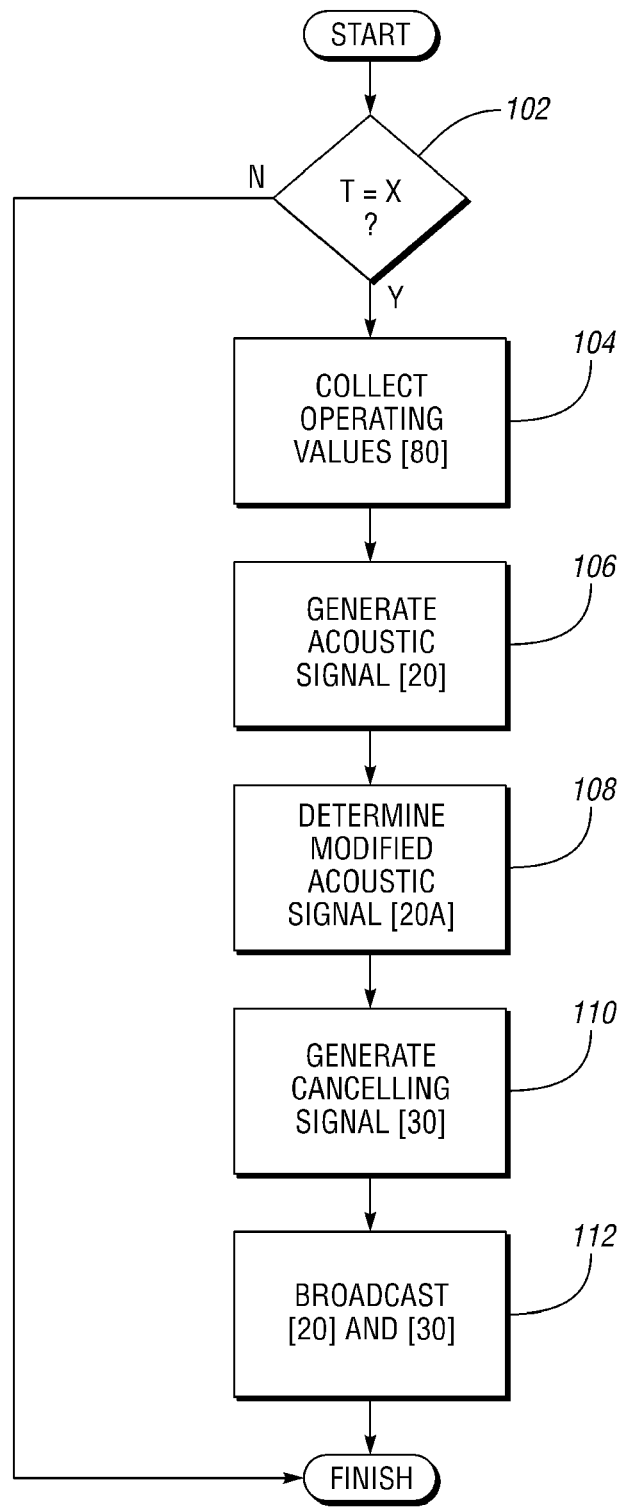
FIG. 3 is a graphical flow chart describing a method or algorithm for actively cancelling a synthesized noise or sound within the interior of the vehicle shown in FIG. 1.

Referring to FIG. 3, and with reference to the various systems and components shown in FIGS. 1 and 2 and described above, the algorithm 100 resident within or accessible by the controller 18 begins with step 102, wherein the algorithm 100 determines whether the present transmission state or mode (T) corresponds to a predetermined transmission mode (X), as determined by the sensor 23C of FIG. 1 or by any other suitable means. For example, the predetermined transmission mode (X) can be a presently commanded reverse or a forward electric drive mode as set forth above. If T=X, the algorithm 100 proceeds to step 104, with the algorithm 100 otherwise exiting.

At step 104, the vehicle operating values 80 are collected as described above and relayed to the controller 18. That is, the sensors 23A, 23B, and 23C each detect, sense, measure, calculate, or otherwise collect a vehicle operating value, such as throttle level (Th %), the vehicle speed (N), and the transmission mode or state (T), respectively. Once collected, the algorithm 100 proceeds to step 106.

At step 106, the acoustic signal 20 to be broadcast via the audio speakers 19F, 19R is generated by the controller 18, such as by synthesizing the acoustic signal 20 using the DSS 24 or by accessing or selecting an appropriate sound file from the SFL 26. As noted above, the particular sound file generated or selected at step 106 can vary in conjunction with the characteristics of the vehicle operating values 80 determined via the sensors 23A, 23B and 23C. Once the acoustic signal 20 is generated, and prior to broadcasting of the acoustic signal 20, the algorithm 100 proceeds to step 108.

At step 108, the acoustic signal 20 is filtered and/or processed within the controller 18, e.g., by the processing module 34A, in order to temporarily delay the broadcast of the acoustic signal 20, as well as to compensate for any signal attenuation, damping, and/or other interference provided by the vehicle body 14. That is, as will be understood by those of ordinary skill in the art, the acoustic signal 20 transmitted or broadcast outside of the vehicle 10 and away from the passenger 11 will not be perceived within the interior 12 in the same manner, i.e., with the same volume, frequency, pitch, etc., of the original or unadulterated waveform describing the acoustic signal 20, i.e., approximately as perceived by one positioned in the path of the vehicle 10 in close proximity thereto.

Therefore, by accounting for the unique acoustic characteristics of the vehicle 10, such as by processing the acoustic signal 20 at step 108 through a calibrated acoustic model or filter representing the known or modeled acoustic characteristics of the vehicle 10, the modified acoustic signal 20A to be cancelled represents an attenuated, damped, or otherwise modified portion of the acoustic signal 20 broadcast at step 110 as described below. Also, the length of the required delay can be dependent to at least some extent on the speed of the processor 21 and the processor modules 34A, 34B, which can be separate devices as shown in FIG. 2 or integrated into a common device without departing from the intended scope of the invention. Once the acoustic signal 20 has been sufficiently processed, the modified acoustic signal 20A is generated, and the algorithm 100 proceeds to step 110.

At step 110 of the algorithm 100, the waveform of the modified acoustic signal 20A generated or otherwise determined at step 108 is analyzed or processed as needed to generate the cancelling signal 30. As noted above, the cancelling signal 30 is a noise-cancelling waveform or sound wave having an amplitude that is directionally proportional to that of the modified acoustic signal 20A, but having opposite phase or polarity. Phase cancellation is thus provided by the combination of the modified acoustic signal 20A and the cancelling signal 30 within the vehicle interior 12. That is, destructive interference provided by the cancelling signal 30 reduces the amplitude of the perceived noise, i.e., the acoustic signal 20, within the interior 12. The resultant waveform perceived by a passenger 11 within the interior 12 is thus substantially reduced or quieted in relation to the acoustic signal 20 being broadcast via the audio speakers 19F, 19R. Once the cancelling signal 30 is generated, the algorithm 100 proceeds to step 112.

At step 112, the modified acoustic signal 20A and the cancelling signal 30 are broadcast via the audio speakers 19F, 19R and the audio speakers 19I, respectively. The acoustic signal 20 is thus broadcast in its original form, to be perceived by any person in the path of the vehicle 10, while the cancelling signal 30 is broadcast within the vehicle interior 12 to substantially cancel the attenuated or modified acoustic signal 20A as described above. In this manner, relative tranquility is preserved within the vehicle interior 12, without otherwise affecting the operation of the pedestrian warning functionality of the ANC system 32 shown in FIG. 2.

While the best modes for carrying out the invention have been described in detail, those familiar with the art to which this invention relates will recognize various alternative designs and embodiments for practicing the invention within the scope of the appended claims.

The invention claimed is:

1. A vehicle having an electric drive mode, the vehicle comprising:
    a vehicle body defining a vehicle interior;
    a first set of audio speakers positioned outside of the vehicle interior;
    a second set of audio speakers positioned within the vehicle interior; and
    a controller configured for generating an acoustic signal based on a plurality of vehicle operating values, for broadcasting the acoustic signal via the first set of audio speakers during the electric drive mode, and for generating and broadcasting a cancelling signal via the second set of audio speakers;
    wherein the cancelling signal is broadcast in a coordinated manner with the broadcast of the acoustic signal, and is adapted to substantially cancel an attenuated portion of the acoustic signal within the vehicle interior, the attenuated portion resulting from a propagation of the acoustic signal into the vehicle interior.

2. The vehicle of claim 1, wherein the first set of audio speakers includes at least one audio speaker positioned at the front of the vehicle and at least one audio speaker positioned at the rear of the vehicle.

3. The vehicle of claim 2, wherein the controller is adapted for determining a direction of travel of the vehicle during the electric drive mode, and for broadcasting the acoustic signal from a different one of the front and the rear of the vehicle depending on the direction of travel of the vehicle.

4. The vehicle of claim 1, wherein the electric drive mode includes a reverse mode and at least one low-speed forward drive mode.

5. The vehicle of claim 1, wherein the controller includes a digital signal synthesizer (DSS), and wherein the acoustic signal is automatically synthesized by the controller during the electric drive mode using the DSS.

6. The vehicle of claim 1, wherein the controller includes a sound file library (SFL) containing a plurality of pre-recorded sound files, and wherein the first acoustic signal is a sound file automatically selected from the SFL.

7. An active noise cancellation (ANC) system for use with a vehicle having a vehicle body defining a vehicle interior and at least one electric drive mode, the ANC system comprising:
    a first set of audio speakers positioned outside of the vehicle interior;
    a second set of audio speakers positioned within the vehicle interior; and
    a controller operable for:
        automatically generating an acoustic signal during the at least one electric drive mode;
        processing the acoustic signal to thereby generate a modified acoustic signal, wherein the modified acoustic signal represents an attenuated portion of the acoustic signal resulting from a propagation of the acoustic signal from the first set of speakers, through the vehicle body, and into the vehicle interior;
        generating a cancelling signal having an amplitude that is proportional to that of the modified acoustic signal and a phase that is opposite that of the modified acoustic signal; and
        broadcasting the acoustic signal via the first set of audio speakers in a coordinated manner with a broadcasting of the cancelling signal via the second set of audio speakers, thereby substantially cancelling the modified acoustic signal within the vehicle interior.

8. The ANC system of claim 7, further comprising at least one of:
    a digital sound synthesizer (DSS) operable for synthesizing the acoustic signal, and a sound file library (SFL) containing the acoustic signal.

9. The ANC system of claim 7, wherein the vehicle includes a vehicle seat, and wherein at least one of the second set of audio speakers is positioned on a portion of the vehicle seat.

10. The ANC system of claim 7, wherein the controller is adapted to delay the broadcast of the cancelling signal for a calibrated duration sufficient for a propagation of the acoustic signal from the first set of audio speaker into the vehicle interior.

11. The ANC system of claim 7, further comprising an entertainment system adapted to generate a sound signal within the vehicle interior, wherein the broadcast of the cancelling signal does not substantially interfere with the sound signal.

12. A method for actively cancelling a synthesized sound within a vehicle interior of a vehicle having a vehicle body defining the vehicle interior, at least one electric drive mode, a first set of audio speakers positioned outside of the vehicle interior, and a second set of audio speakers positioned within the vehicle interior, the method comprising:
    collecting a set of vehicle operating values, including detecting the at least one electric drive mode;
    generating an acoustic signal as the synthesized sound during the at least one electric drive mode, the acoustic signal having a characteristic that is determined at least in part by the set of vehicle operating values;
    processing the acoustic signal to thereby generate a modified acoustic signal, wherein the modified acoustic signal approximates an attenuated portion of the acoustic signal resulting from a propagation of the acoustic signal through the vehicle body and into the vehicle interior;
    generating a cancelling signal adapted to substantially cancel the modified acoustic signal within the vehicle interior; and
    coordinating the broadcast of the acoustic signal via the first set of audio speakers and the cancelling signal via the second set of audio speakers during the at least one electric drive mode to thereby cancel the modified acoustic signal within the vehicle interior.

13. The method of claim 12, wherein collecting a set of vehicle operating values further includes collecting at least one of: a speed of the vehicle and a throttle level of the vehicle.

14. The method of claim 12, wherein generating an acoustic signal includes at least one of: synthesizing the acoustic signal using a digital sound synthesizer and selecting the acoustic signal from a pre-recorded sound file library.

15. The method of claim 12, wherein processing the acoustic signal to thereby generate a modified acoustic signal includes processing the acoustic signal through a model describing the attenuation effect of the vehicle body.

* * * * *